Figure 1:
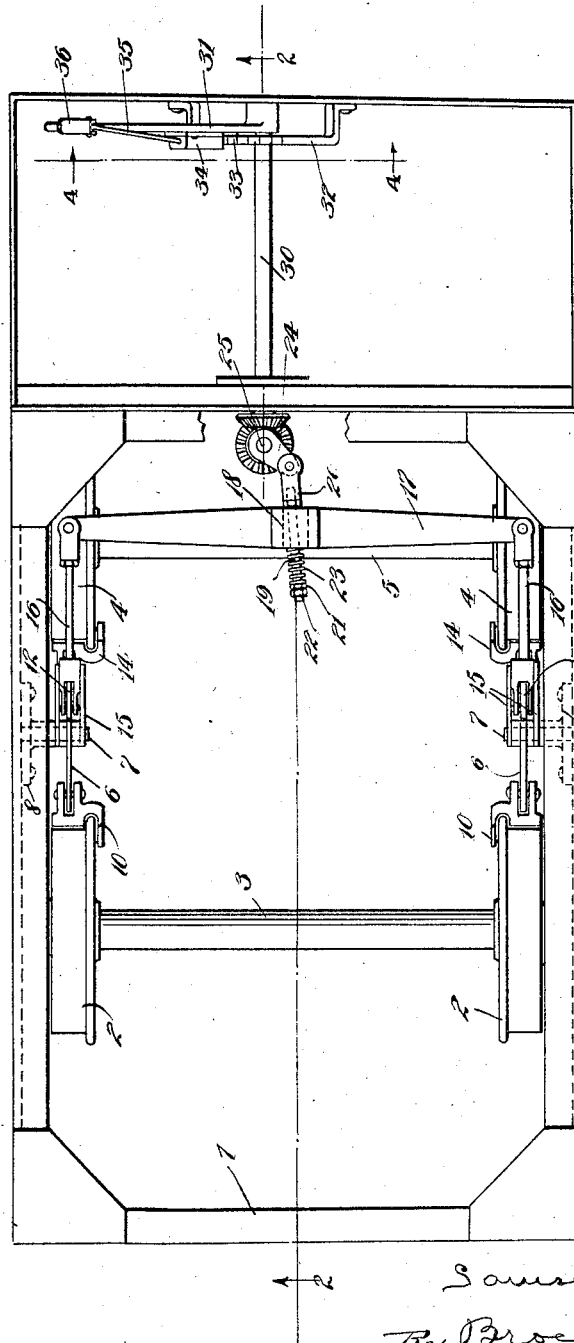

Dec. 21, 1926.

S. D. WRIGHT

BRAKING MECHANISM

Filed March 1, 1919

1,611,702

2 Sheets-Sheet 1

Inventor,
Samson D. Wright.
By Brockett & Hyde
Attys.

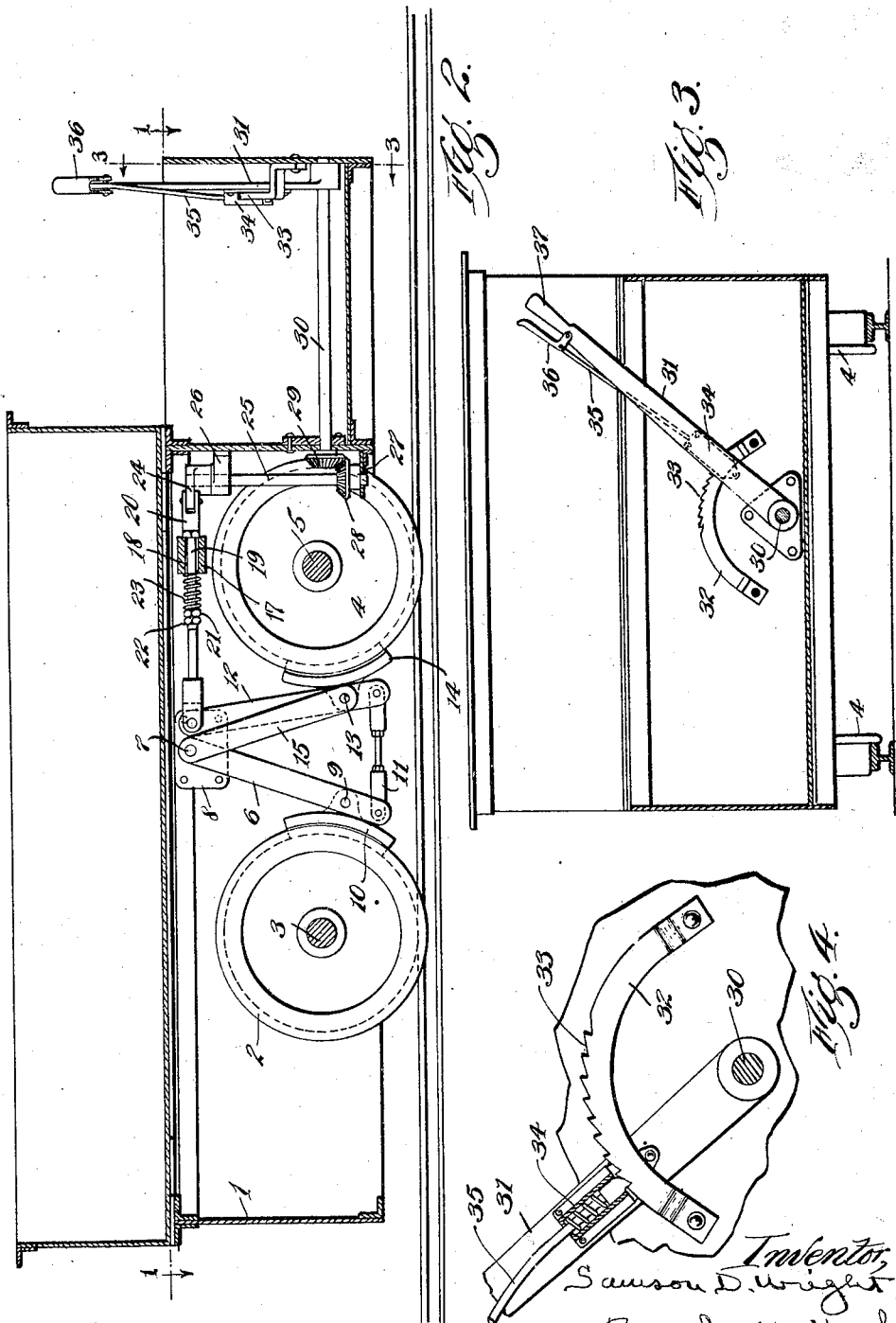

Patented Dec. 21, 1926.

1,611,702

UNITED STATES PATENT OFFICE.

SAMSON D. WRIGHT, OF CLEVELAND HEIGHTS, OHIO, ASSIGNOR TO THE ATLAS CAR AND MANUFACTURING COMPANY, OF CLEVELAND, OHIO, A CORPORATION OF OHIO.

BRAKING MECHANISM.

Application filed March 1, 1919. Serial No. 279,979.

This invention relates to braking mechanism for cars and locomotives.

In the equipment of brakes for cars and locomotives it has been customary to connect the brake shoes with the operating handle or other means by suitable levers, draw-bars and rods, so that there is a rigid pull between the operating member and the brake shoe, and if any holding means for the operating device is provided of the usual ratchet or segment type it is often impossible to bring about the proper braking action for when the pawl is in one tooth it is impossible to move the operating member to the next tooth which would produce the proper braking action, due to the rigid structure of the braking mechanism. In the present device this difficulty has been overcome by inserting a yielding member at a suitable point in the mechanism so that it is possible for the operator to move the operating device with an increased effort at times so as to reach the next tooth in the holding mechanism. For example, let us assume that by the normal operation of the braking member the pawl engages a certain tooth in the ratchet segment and the braking action is not sufficient to hold the car or locomotive, then by an increased effort the controlling mechanism may be operated so as to bring the pawl into engagement with another tooth which produces the proper braking action. This is possible by reason of the fact that the yielding device employed absorbs any power applied to the operating member in excess of what is necessary to effect proper braking operation of the shoes. In other words, my device permits a finer adjustment of braking mechanism than is represented by the spacing of the teeth of the ratchet.

The invention may be further briefly summarized and described as consisting in the construction and combination of parts set forth in the following description, drawings and claims.

Referring to the drawings, Fig. 1 is a top plan view of a locomotive body frame with the braking mechanism applied thereto; Fig. 2 is a longitudinal vertical sectional view on the line 2—2, Fig. 1; Fig. 3 is a detail view on the line 3—3, Fig. 2, and Fig. 4 is a detail view of the holding means for the operating device taken on the line 4—4, Fig. 1.

In the drawings, 1 represents the main frame which is supported upon the wheels 2 secured to the axle 3 and the wheels 4 secured upon the axle 5. Between the wheels and secured to a portion of the body above the same and on each side of the car is a link 6 pivoted at its upper end on a pin 7 carried by a plate 8. Near the lower end this link 6 is connected by means of a pin 9 with a brake shoe 10 adapted to engage the rear wheels 2. The lower end of link 6 is connected to an adjustable rod 11. This rod at its opposite end is connected to the lower end of an operating link 12 which extends up to a point near the plate 8. This operating link 12 is pivotally connected by a pin 13 to a brake shoe 14. This brake shoe and one on the opposite side engage the wheels 4. In order to support the operating link 12 a supporting link 15 is provided and this link is pivotally connected at its lower end to the pin 13 and at its upper end to the pin 7. The two operating links 12, one on each side of the car, are connected by means of rods 16 pivotally secured to opposite ends of an equalizing brake beam 17 which is provided at its center with a horizontal elongated opening 18. This elongated opening 18 receives a pull rod 19 provided at one end with a clevis 20 and at its opposite end with an adjusting nut 21 held in place by a check nut 22. Between the nut 21 and the rear side of the equalizing brake beam 17 is a coil spring 23 which thrusts against the nut 21 and against the bar, thus pulling the head of the clevis 20 against the front edge of the equalizing brake beam 17. The clevis 20 is pivotally connected to a crank arm 24 mounted upon the upper end of a shaft 25 supported in suitable bearings 26 and 27 secured to the frame. Near the lower bearing 27 the shaft 25 is provided with a bevel pinion 28 meshing with the bevel pinion 29 secured to a rock shaft 30 which is supported in suitable bearings in the frame. The forward end of this rock shaft is provided with an operating member or brake lever 31 extending up along the front of the car adjacent to a segment 32 which is secured to the front of the car. This segment is provided with ratchet teeth 33 adapted to be engaged by a pawl 34 forced by a spring into engagement with the teeth and controlled by a rod 35 pivotally connected to an operating handle 36 adjacent to the handle 37 forming a part of the brake lever 31. When the brake lever is moved to the left from the position shown in Fig. 3 the shaft 30 is rocked in a counter-clockwise direction, as viewed in Fig. 3 and through the pinions the crank 24 is moved in a counter-clockwise direction as viewed in Fig. 1, with a result that the pull rod through the spring 23 moves the equalizing brake beam forward and applies the brake in an obvious manner.

If the operator should find by the ordinary manipulation of the brake lever that the motion of the vehicle has not been arrested he may by an increased effort, and through the instrumentality of the spring 23 move the pawl to another notch when the motion of the vehicle would be arrested.

What I claim is:

1. Equalizing brake mechanism for two tandem wheels of a vehicle, comprising a pair of links adapted for connection to the vehicle body above and between the two wheels, brake shoes carried thereby, one for each wheel, a two arm lever pivotally connected to one of said links, a rod connecting one arm of said lever to the other link, and means connected to the other arm of said lever for actuating the same.

2. Equalizing brake mechanism for two tandem wheels of a vehicle, comprising a pair of links adapted for connection to the vehicle body above and between the two wheels, brake shoes carried thereby, one for each wheel, a two arm lever pivotally connected to one of said links adjacent the brake shoe thereon and having an arm depending below said brake shoe, a rod connecting said depending lever arm to the other link below the brake shoe connected thereto, and means connected to the second arm of said lever for actuating the same.

3. Equalizing brake mechanism for two tandem wheels of a vehicle, comprising a pair of links adapted for connection to the vehicle body above and between the two wheels, brake shoes carried thereby, one for each wheel, a two arm lever pivotally connected to one of said links, a rod connecting one arm of said lever to the other link, and means connected to the other arm of said lever for actuating the same, said rod being adjustable as to length to vary the braking effect.

4. Equalizing brake mechanism for two tandem wheels of a vehicle, comprising a pair of links adapted for connection to the vehicle body above and between the two wheels, brake shoes carried thereby, one for each wheel, a two arm lever pivotally connected to one of said links adjacent the brake shoe thereon and having an arm depending below said brake shoe, a rod connecting said depending lever arm to the other link below the brake shoe connected thereto, and means connected to the second arm of said lever for actuating the same, said rod being adjustable as to length to vary the braking effect.

In testimony whereof I affix my signature.

SAMSON D. WRIGHT.